(No Model.)
M. GOODMAN & J. J. & W. R. RAWLINGS.
HANDLE PROTECTOR FOR VELOCIPEDES.
No. 587,956. Patented Aug. 10, 1897.
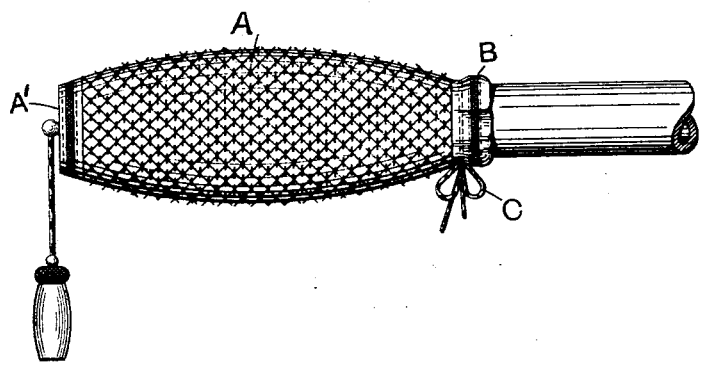
Witnesses:
Harry Bailey
Frank S. Ober
Inventors:
Mark Goodman
John J. Rawlings
William R. Rawlings
by M. J. Rosenbaum
Atty.

UNITED STATES PATENT OFFICE.

MARK GOODMAN, JOHN JOSEPH RAWLINGS, AND WILLIAM ROBERT RAWLINGS, OF LONDON, ENGLAND.

HANDLE-PROTECTOR FOR VELOCIPEDES.

SPECIFICATION forming part of Letters Patent No. 587,956, dated August 10, 1897.

Application filed September 30, 1896. Serial No. 607,434. (No model.) Patented in England June 17, 1896, No. 13,307.

*To all whom it may concern:*

Be it known that we, MARK GOODMAN, JOHN JOSEPH RAWLINGS, and WILLIAM ROBERT RAWLINGS, citizens of the United Kingdom of Great Britain and Ireland, residing at Kensington, in the county of Middlesex, England, have invented certain new and useful Improvements in Handle-Protectors for Velocipedes and other Steerable Road-Vehicles, (patented in Great Britain June 17, 1896, No. 13,307,) of which the following is a specification.

If the handles of bicycles, tricycles, and other steered vehicles and carriages used on common roads are made of an absorbent material—cork and the like—they speedily become dirty and unpleasant in use, particularly for ladies, while if they are made of ivory, celluloid, porcelain, or other non-absorbent material they are uncomfortable. This invention has been designed to obviate these defects and at the same time to improve the appearance of the handles. For this purpose we construct a tubular sleeve, as hereinafter described, which is adapted to be readily placed upon and removed from the handles.

The sleeves may be constructed of any one or more of a large variety of suitable materials—as, for example, any textile yarns or threads knitted, braided, netted, woven, or otherwise formed to the required shape and dimensions, or cloth, felt, close netting, india-rubber, hair, silk, kid, leather, and the like sewed, cemented, or similarly made up into the required tubular form. They may obviously also be made to a large variety of patterns, to have any color or combinations of colors and designs, and to have as accessories any desired trimmings, ornaments, small bells, and the like.

For ladies' use the sleeves will be made to harmonize with the dress or gloves of the user, and in all cases it is the intention that they shall either be made of a cheap material which can be thrown away when dirty or of such a more expensive material as may be readily cleaned or washed, as required. Usually we propose to construct them of braided or knitted silk or chenille or of kid.

One of our sleeves or protectors is presented in the accompanying drawing as applied to the handle of a bicycle and is seen in side elevation. In this case it is supposed to be made of chenille or soft silk cord A, closely netted. When off the handle, it may be quite tubular in form with a closed end, as from the nature of its construction it will readily adapt itself to the shape of the handle when placed thereon. It may be made by severance from an originally longer tube or it may be made singly, in which case the end may be closed, like the end of a finger of a glove, during construction. When made by severance from a longer tube, one end may or may not be closed up. Generally, however, the end A' should be closed, as this prevents the sleeve creeping up the handle. The other end B may have threaded around its edge or near it a silk shirring cord or ribbon C, which when the sleeve is on the handle may be drawn tight and fastened by tying in a bow. The end of this cord may have tassels or other ornaments.

Instead of silk ribbon or cord other equivalent materials or an elastic band may be used. Generally the elasticity of the material is sufficient to hold the sleeve in position without any special fastening.

Having now particularly described and ascertained the nature of our said invention and in what manner the same is to be performed, we declare that what we claim is—

A sleeve or protector for the handles of bicycles and similar vehicles composed of a netted or braided fabric in the form of a tube permanently closed at one end and having its other end open, the natural elasticity of the fabric being availed of to adapt the sleeve to the shape of the handle.

In testimony that we claim the foregoing as our invention we have signed our names, in presence of two witnesses, this 26th day of August, 1896.

MARK GOODMAN.
    JOHN JOSEPH RAWLINGS.
    WILLIAM ROBERT RAWLINGS.

Witnesses:
 J. G. TASKER,
 FREDERICK JOHN BARTER COLLIS.